United States Patent
Won et al.

(10) Patent No.: US 9,311,563 B2
(45) Date of Patent: Apr. 12, 2016

(54) METHOD AND APPARATUS FOR GENERATING HIERARCHICAL SALIENCY IMAGES DETECTION WITH SELECTIVE REFINEMENT

(71) Applicants: SAMSUNG ELECTRONICS CO., LTD., Suwon-si, Gyeonggi-do (KR); KOREA UNIVERSITY RESEARCH AND BUSINESS FOUNDATION, Seoul (KR)

(72) Inventors: Jong-hoon Won, Suwon-si (KR); Jun-seong Kim, Seoul (KR); Chang-su Kim, Seoul (KR); Kazuhiko Sugimoto, Seongnam-si (KR); Masataka Hamada, Suwon-si (KR)

(73) Assignees: Samsung Electronics Co., Ltd., Suwon-si (KR); Korea University Research and Business Foundation, Seoul (KR)

(*) Notice: Subject to any disclaimer, the term of this patent is extended or adjusted under 35 U.S.C. 154(b) by 0 days.

(21) Appl. No.: 14/528,088

(22) Filed: Oct. 30, 2014

(65) Prior Publication Data

US 2015/0125082 A1    May 7, 2015

(30) Foreign Application Priority Data

Nov. 1, 2013    (KR) .................... 10-2013-0132535

(51) Int. Cl.
G06K 9/46    (2006.01)
(52) U.S. Cl.
CPC .................... G06K 9/4671 (2013.01)
(58) Field of Classification Search
USPC ............... 382/171, 190, 195, 209, 278, 282; 358/537, 538, 452, 453
See application file for complete search history.

(56) References Cited

U.S. PATENT DOCUMENTS

| | | | | |
|---|---|---|---|---|
| 7,583,857 B2 * | 9/2009 | Xu | ........ | G06K 9/3216 358/450 |
| 7,949,186 B2 * | 5/2011 | Grauman | ........ | G06K 9/4671 382/159 |
| 8,175,346 B2 * | 5/2012 | Rowe | ........ | G06K 9/00013 340/5.53 |
| 8,180,146 B2 * | 5/2012 | Ngan | ........ | G06K 9/00704 382/153 |
| 8,200,010 B1 * | 6/2012 | Jing | ........ | G06K 9/00751 382/164 |
| 8,577,156 B2 * | 11/2013 | Stankiewicz | ........ | G06K 9/4671 382/103 |
| 8,638,979 B2 | 1/2014 | Singhal et al. | | |
| 8,751,306 B2 * | 6/2014 | Burger | ........ | G06F 21/316 705/14.53 |

FOREIGN PATENT DOCUMENTS

| | | |
|---|---|---|
| KR | 10-0914312 B1 | 8/2009 |
| KR | 10-1018299 B1 | 2/2011 |
| KR | 10-1031083 B1 | 4/2011 |
| KR | 10-1206132 B1 | 11/2012 |

* cited by examiner

*Primary Examiner* — Yosef Kassa
(74) *Attorney, Agent, or Firm* — Drinker Biddle & Reath LLP

(57) ABSTRACT

A method of generating a saliency image, which includes: converting an input image into an input image of the first size and an input image of the second size; applying a saliency extraction scheme to the input image of the first size to generate a first saliency image; converting the first saliency image to the second size; extracting an area that satisfies a first condition from the converted first saliency image; determining an area of the input image of the second size that corresponds to the extracted area; and generating a second saliency image by multiplying an image generated by applying the saliency extraction scheme to the determined area, and the converted first saliency image.

21 Claims, 7 Drawing Sheets

METHOD AND APPARATUS FOR GENERATING HIERARCHICAL SALIENCY IMAGES DETECTION WITH SELECTIVE REFINEMENT

CROSS-REFERENCE TO RELATED APPLICATIONS

This application claims the priority benefit of Korean Patent Application No. 10-2013-0132535, filed on Nov. 1, 2013 in the Korean Intellectual Property Office, the disclosure of which is incorporated herein in its entirety by reference.

BACKGROUND

1. Field

One or more embodiments of the present disclosure relate to a method and apparatus for generating hierarchical saliency images with selective refinement.

2. Description of the Related Art

Recently, there has been an increased interest in saliency extraction schemes in the computer vision and image processing field.

One saliency extraction scheme uses the random walk theory to convert the image into a graph in order to obtain the saliency of nodes of the image.

In this scheme, the image may be divided into blocks and each divided block may be defined as a node. An edge weight is set using a movement frequency relation between a plurality of nodes, and a transition matrix capable of converting the set edge weight, which is displayed as a matrix, into a Markov chain form, may be produced.

According to the random walk theory, the steady-state distribution produced in the transition matrix may become the frequency with which each node may be "visited" or viewed by a human viewer. A node is said to have a high visiting frequency if it is in an area that a human viewer looks at frequently. Hence, the saliency of each node may be detected using the steady-state distribution.

SUMMARY

One or more embodiments of the disclosure include a method of generating a more accurate saliency image by using selective refinement when detecting saliency by using a plurality of images that have been generated by converting an input image into images of different sizes.

Additional aspects will be set forth in part in the description that follows and, in part, will be apparent from the description, or through practice of the disclosed embodiments.

According to one or more embodiments of the disclosure, a method of generating a saliency image includes: converting an input image into an input image of the first size and an input image of the second size; applying a saliency extraction scheme to the input image of the first size to generate a first saliency image; converting the first saliency image to the second size; extracting an area that satisfies a first condition from the converted first saliency image; determining an area of the input image of the second size that corresponds to the extracted area; and generating a second saliency image by multiplying an image generated by applying the saliency extraction scheme to the determined area, and the converted first saliency image.

The first size and the second size may be smaller than the size of the input image and the first size may be smaller than the second size.

The first condition may be set based on a gray level value of a pixel of the resized first saliency image.

In some embodiments, the method further includes: converting the input image into an input image of a third size; converting the second saliency image to the third size; extracting an area that satisfies a second condition from the converted second saliency image; determining an area corresponding to the extracted area of the input image of the third size; and generating a third saliency image by multiplying an image generated by applying the saliency extraction scheme to the determined area, and the converted second saliency image.

The method may further include converting the third saliency image into a size of the input image.

The third size may be smaller than the input image, the first size may be smaller than the second size, and the second size may be smaller than the third size.

The second condition may be set based on a gray level value of the converted second saliency image.

A gray level value in the second condition may be greater than the gray level value in the first condition.

In one or more embodiments of the disclosure, an apparatus for generating a saliency image includes: a size conversion unit that converts an input image into a input image of a first size and an input image of the second size and converts a first saliency image into the second size; a first saliency image generation unit that generates the first saliency image by applying a saliency extraction scheme to the input image of the first size; an area determination unit that extracts an area that satisfies a first condition from the converted first saliency image and determines an area corresponding to the extracted area from the input image of the second size; and a second saliency generation unit that generates a second saliency image by multiplying an image generated by applying the saliency extraction scheme to the determined area and the converted first saliency image.

The first size and the second size may be smaller than the input image, and the first size is smaller than the second size.

The first condition may be set based on a gray level value of a pixel of the first saliency image that has been converted into the second size.

In one or more embodiments of the disclosure, the size conversion unit converts the input image into an input image of a third size and converts the second saliency image into the third size, the area determination unit extracts an area that satisfies a second condition from the converted second saliency image and determines an area corresponding to the extracted area from the input image of the third size, and the second saliency image generation unit generates a third saliency image by multiplying an image generated by applying the saliency extraction scheme to the determined area and the converted second saliency image.

The size conversion unit may convert the third saliency image into a size of the input image.

The third size may be smaller than the input image, the first size may be smaller than the second size, and the second size may be smaller than the third size.

The second condition may be set based on a gray level value of the converted second saliency image.

The gray level value in the second condition is greater than the gray level value in the first condition.

According to one or more embodiments of the disclosure, a non-transitory computer-readable storage medium has stored thereon computer executable instructions for performing a method that includes: converting an input image into an input image of the first size and an input image of the second size; applying a saliency extraction scheme to the input image of the first size to generate a first saliency image; converting the first saliency image to the second size; extracting an area that satisfies a first condition from the converted first saliency image; determining an area of the input image of the second size that corresponds to the extracted area; generating a second saliency image by multiplying an image generated by applying the saliency extraction scheme to the determined area, and the converted first saliency image.

In some embodiments of the non-transitory computer-readable storage medium, first size and the second size are smaller than the input image, and the first size is smaller than the second size.

In some embodiments of the non-transitory computer-readable storage medium, the computer executable instructions further include instructions for: converting the input image into an input image of a third size; converting the second saliency image to the third size; extracting an area that satisfies a second condition from the converted second saliency image; determining an area corresponding to the extracted area of the input image of the third size; and generating a third saliency image by multiplying an image generated by applying the saliency extraction scheme to the determined area, and the converted second saliency image.

The computer executable instructions may further include instructions for converting the third saliency image into a size of the input image.

In some embodiments of the non-transitory computer-readable storage medium, third size is smaller than the input image, the first size is smaller than the second size, and the second size is smaller than the third size.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
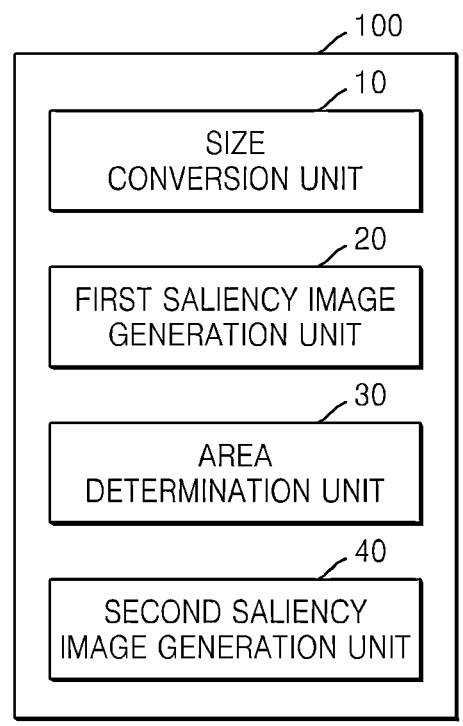
FIG. 1 is a block diagram of a saliency image generation apparatus that performs a hierarchical saliency image generation method, according to an embodiment.

Reference will now be made in detail to embodiments, examples of which are illustrated in the accompanying drawings, wherein like reference numerals refer to like elements throughout. In the description with reference to the drawings, like reference numerals in the drawings denote like elements, and repetitive descriptions thereof will be omitted. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Although terms, such as "first" and "second", may be used to describe various elements, the elements are not limited by these terms. These terms are only used to differentiate one element from another element.

The present disclosure allows various kinds of modification and can have many embodiments, and particular embodiments are illustrated in the drawings and described in detail herein. However, it is to be understood that the particular embodiments do not limit the present disclosure to a particular embodiment but include every modified, equivalent, or replaced one within the spirit and technical cope of the present disclosure. As used herein, the term "and/or" includes any and all combinations of one or more of the associated listed items.

The terminology used in this application is used to describe particular embodiments and does not limit the present disclosure. An expression in the singular includes an expression in the plural unless they are clearly different from each other in context. In this application, terms, such as "include" and "have", are used to indicate the existence of features, numbers, steps, operations, elements, parts, or combinations thereof mentioned herein without excluding in advance the possibility of existence or addition of one or more other features, numbers, steps, operations, elements, parts, or combinations thereof.

FIG. 1 is a block diagram of a saliency image generation apparatus 100 which performs a hierarchical saliency image generation method, according to an embodiment.

The saliency image generation apparatus 100 may include a size conversion unit 10, a first saliency image generation unit 20, an area determination unit 30, and a second saliency image generation unit 40.

Hereinafter, the components will be described.

The size conversion unit 10 may convert an input image into a first size, a second size, or a third size.

Generally, an input image is formed of a plurality of pixels, and each pixel may include color information that may indicate the brightness of each of red R, green G, and blue B in 256 kinds of grayscale.

For example, the first size, the second size, or the third size may be smaller than the size of the input image, and it may be that the first size<the second size<the third size. Furthermore, the first size, the second size, or the third size, may be of a regular quadrilateral. For example, the first size may be 64×64, the second size may be 128×128, and the third size may be 256×256.

Generally, a first saliency image or a second saliency image may display the saliency extracted from the input image in a single color or as a luminance image. As such, each pixel in the first saliency image or the second saliency image may include color information which may display 256 gray levels ranging from 0 (black) to 255 (white).

For example, the first saliency image may have the first size, the second saliency image may have the second size, and the third saliency image may have the third size.

Furthermore, the first saliency image may be converted into the second size, and the second saliency image may be converted into the third size. Furthermore, the third saliency image may be converted into the size of the input image.

The first saliency image generation unit 20 according to an embodiment may generate the first saliency image by applying a saliency extraction scheme to an input image that has been converted into the first size in the size conversion unit 10.

The saliency extraction scheme according to an embodiment may be a graph-based scheme that divides the input image into a plurality of blocks and defines the plurality of divided blocks into a plurality of nodes.

An edge weight may be set by using the movement frequency relationship between a multiple nodes. For example, the edge weight may be set by extracting the characteristic map of each node.

After extracting the characteristic map of an input image, the saliency extraction may be performed based on the Random walk theory.

1. Characteristic Map Extraction

In order to effectively express characteristics of an input image, the characteristic map, which uses image brightness or RGB color channel, etc., may be used.

The RGB color channel is generally used in storing or processing an image, but is different from the scheme of actually recognizing color by a person, and thus the characteristic map according to an embodiment may include a brightness characteristic map and two color characteristic maps based on the RGB color channel.

The brightness characteristic map may be extracted by normalizing the intensity, which is obtained by averaging the basic color channel of R, G, and B of each pixel, between 0 and 1. When each color channel of the input image is r, and b, the characteristic map $F_1$ is as follows:

$$I(\text{Intensity}) = \frac{r+g+b}{3},$$

$$F_I = \frac{1}{255}$$

$$R = \frac{1}{I}\left(r - \frac{g+b}{2}\right),$$

$$G = \frac{1}{I}\left(g - \frac{b+r}{2}\right),$$

$$B = \frac{1}{I}\left(b - \frac{r+g}{2}\right),$$

$$Y = \frac{1}{I}\left(\frac{r+g}{2} - \frac{|r-g|}{2} - b\right).$$

$$\Delta RG = R - G,$$

$$\Delta BY = B - Y,$$

$$F_{RG} = \frac{\Delta RG - \Delta RG_{min}}{\Delta RG_{max} - \Delta RG_{min}},$$

$$F_{BY} = \frac{\Delta BY - \Delta BY_{min}}{\Delta BY_{max} - \Delta BY_{min}}.$$

2. Saliency Extraction Using the Random Walk Theory

An input image may be divided into a plurality of blocks, and each divided block may be defined as a node so as to convert the input image into a graph.

For example, in the input image that has been converted into a graph, the block of the 8×8 size may be defined as each node. In this case, in the extracted characteristic map of the input image, the elements corresponding to the $i^{th}$ block are the $f_{RG,i}$, $f_{BY,i}$, $f_{I,i}$, $i^{th}$ node $x_i$ may be expressed as a vector of 192 dimensions as follows:

$$x_i = [f_{I,i}^T f_{RG,i}^T f_{BY,i}^T]^T$$

The weight of the edge, according to an embodiment, may be defined as a difference between respective nodes. Furthermore, the weight of the edge may be calculated by considering visual characteristics and spatial characteristics between respective nodes as well as the characteristic map including the brightness characteristic map and the color characteristic map of respective nodes.

For example, when the visual characteristics of node i and node j are similar, a small weight may be applied, and when visual characteristics of node i and node j are different, a large weight may be applied. Furthermore, when node i and node j are placed away from each other, the mutual relation becomes weak, and thus special restrictions may be added. As such, the weight $w_{ij}$ of the edge, which connects node i with node j, is given as follows:

$$w_{ij} = \|x_i - x_j\| e^{-0.5 D_{ij}}$$

In the above equation, $D_{ij}$ is an Euclidean distance between node i and node j, and the weight value may be reduced as the spatial distance increases.

Using the above equations, the weight value of the edge for all nodes included in the input image which has been converted into a graph may be displayed as one matrix A.

$$A = \begin{bmatrix} 0 & w_{1,2} & w_{1,3} & \cdots & w_{1,N-1} & w_{1,N} \\ w_{2,1} & 0 & w_{3,2} & \cdots & w_{N-1,1} & w_{2,N} \\ w_{3,1} & w_{3,2} & 0 & \cdots & \vdots & \vdots \\ \vdots & \vdots & \vdots & \ddots & \vdots & \vdots \\ w_{N-1,1} & w_{N-1,2} & \cdots & \cdots & 0 & w_{N-1,N} \\ w_{N,1} & w_{N,2} & \cdots & \cdots & w_{N,N-1} & 0 \end{bmatrix}.$$

In order to transform to probability model in a Markov chain form, the matrix A may be normalized so that the sum of outbound edges transmitted for respective nodes becomes 1 so as to produce a transition matrix P.

Likewise, in a graph defined by probability, when transmission between respective nodes is infinitely repeated, a steady state in which the state no longer changes is reached. That is, distribution $\pi$, which satisfies the following equation, exists.

$$\pi P = \pi.$$

In the Random walk theory, the steady-state distribution $\pi$ may show the frequency at which the random walks visit each node.

Generally, in the saliency extraction scheme that uses a graph, the transmission between respective nodes may be considered through the eyes of a person who is observing an image, and thus the node with a high visit frequency may be considered as an important area. Hence, the following saliency may be defined:

$$S_i = \frac{\pi_i - \pi_{min}}{\pi_{max} - \pi_{min}}.$$

The first saliency image according to an embodiment may be an image including saliency that has been extracted using the Random walk theory in a matrix of the weight of the edge, which has been calculated using the characteristic map of the input image.

Furthermore, the first saliency image may show the saliency, which has been extracted from the input image, as a single color or a luminance image. As such, each pixel in the first saliency image according to an embodiment may include color information which may display 256 gray levels from 0 (black) to 255 (white).

Various examples of the first saliency image will be considered in detail with reference to FIG. 3A, FIG. 3B, FIG. 3C, and FIG. 3D.

The area determination unit 30 according to an embodiment may extract an area that satisfies the first condition from the first saliency image, which has been converted into the second size in the size conversion unit 10, and may determine the area corresponding to the extracted area from the input image, which has been converted into the second size.

Furthermore, the area that satisfies the second condition may be extracted from the second saliency image, which has been converted into the third size in the size conversion unit 10, and the area corresponding to the extracted area may be determined as in the input image, which has been converted into the third size.

Generally, the first saliency image or the second saliency image may display the saliency extracted from the input image in a single color or luminance image. As such, respective pixels in the first saliency image or the second saliency image may include color information, which may show 256 gray levels from 0 (black) to 255 (white).

The first condition according to an embodiment may be set based on the value of the gray level of the pixel of the size-converted first saliency image. Furthermore, the second condition may be set based on the value of the gray level of the pixel of the size-converted second saliency image.

Furthermore, the value of the gray level in the second condition may be higher than the value of the gray level in the first condition.

For example, the first condition may be set so that the number of pixels, which satisfy the first condition in the size-converted first saliency image becomes 70% of the total number of pixels of the size-converted first saliency image. Furthermore, the second condition may be set so that the number of pixels, which satisfy the second condition in the size-converted second saliency image, becomes 50% of the total number of pixels of the size-converted second saliency image.

The second saliency image generation unit 40 according to an embodiment may generate the second saliency image by multiplying: (1) an image generated by applying the saliency extraction scheme to the area which has been determined in the area determination unit 30 by (2) the size-converted first saliency image.

Furthermore, the third saliency image may be generated by multiplying: (1) an image generated by applying the saliency extraction scheme to the area determined in the area determination unit 30 by (2) the size-converted second saliency image.

Various examples of the second saliency image or the third saliency image will be described in detail with reference to FIGS. 7A through 7F.

The operations of the saliency image generation apparatus 100 will be described in order.

Figure 2:
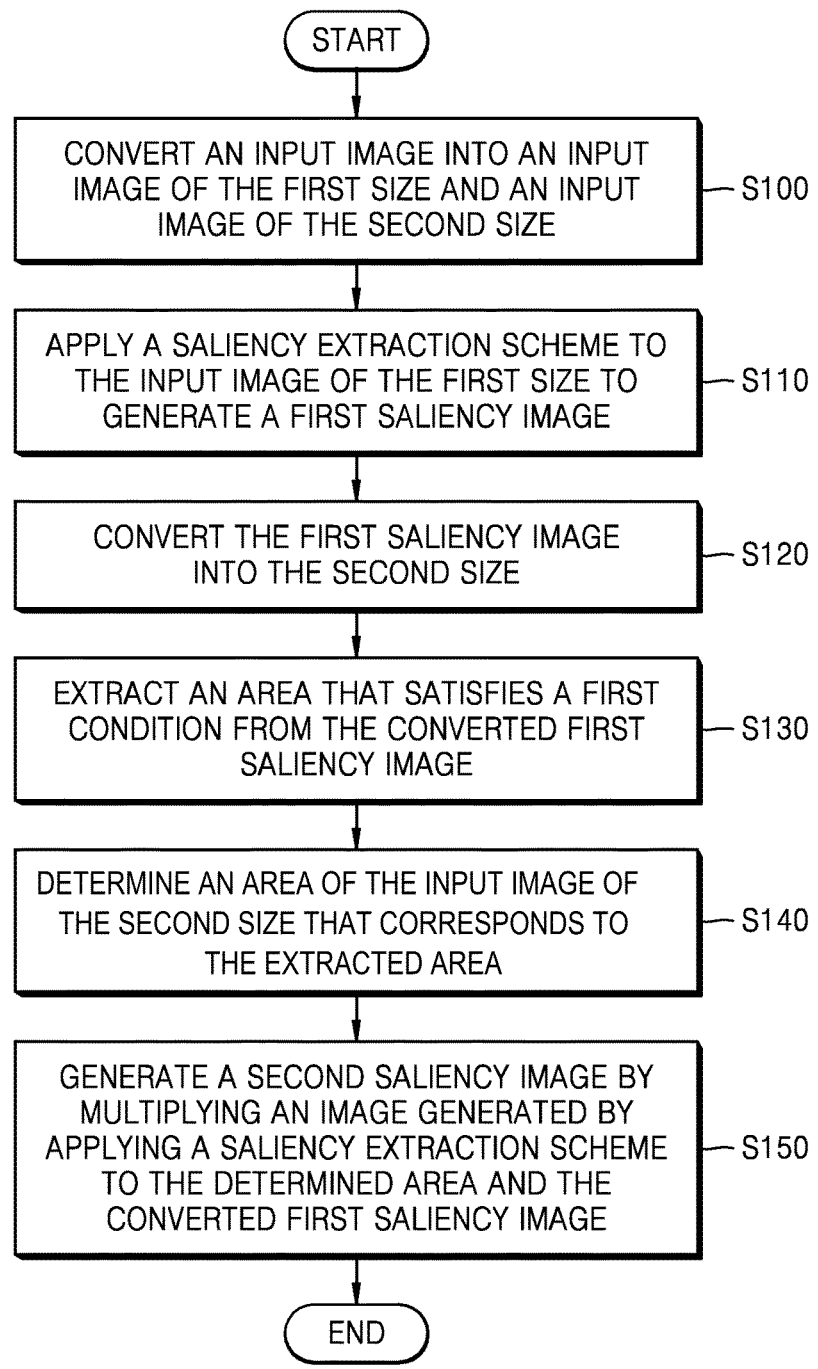
FIG. 2 is a flowchart of a method of generating a hierarchical saliency image using selective refinement.

FIG. 2 is a flowchart of a method of generating a hierarchical saliency image using selective refinement.

In operation S100, the saliency image generation apparatus 100 converts an input image into an input image of the first size and an input image of the second size.

For example, the input image is formed of a plurality of pixels, and each pixel may include color information which may display the brightness of each of red R, green G, and blue B in 256 kinds of grayscale.

Furthermore, the first size and the second size may be smaller than the size of the input image, and it may be that the first size<the second size. Furthermore, the first size or the second size may be of a regular quadrilateral. For example, the first size may be 64×64, and the second size may be 128×128.

According to an embodiment, the saliency may be extracted from respective images that have been converted into multiple of sizes rather than generating the saliency image by extracting the saliency from an input image of one size.

In operation S110, the saliency image generation apparatus 100 applies a saliency extraction scheme to the input image of the first size (generated in operation S100) to generate a first saliency image.

For example, the first saliency image may display the saliency, which has been extracted from the input image, in a single color or as a luminance image. As such, each pixel in the first saliency image according to an embodiment may include color information which may display 256 gray levels from 0 (black) to 255 (white).

Furthermore, the size of the first saliency image may also be 64×64, which is the same as the first size.

In operation S120, the saliency image generation apparatus 100 converts the first saliency image generated in operation S110 into the second size.

According to an embodiment, the first saliency image may be converted into the second size so that the saliency may be extracted from respective images that have been generated by converting the input image into multiple sizes, and the extracted saliency may be selectively refined. In this case, by using the second-sized first saliency image, a predetermined area may be selected from the input image that was converted into the second size in operation S100.

For example, the size of the first saliency image may be 128×128 as in the second size.

In operation S130, the saliency image generation apparatus 100 extracts an area that satisfies a first condition from the converted first saliency image (converted in operation S120).

In operation S140, the saliency image generation apparatus 100 determines an area of the input image of the second size (which was converted in operation S100) that corresponds to the extracted area.

The first saliency image according to an embodiment may be displayed as a single color or as a luminance image. As such, each pixel in the first saliency image may include color information which may display 256 gray levels of from 0 (black) to 255 (white).

The first condition according to an embodiment may be set based on the value of the gray level of the pixel of the converted first saliency image (i.e., the first saliency image that was converted into the second size).

For example, the first condition may be set such that the number of pixels, which satisfy the first condition in the converted first saliency image, becomes 70% of the total number of pixels of the second-sized first saliency image. In this case, the number of pixels, which have been selected from the second-sized input image may become 70% of the total number of pixels of the second-sized input image.

In operation S150, the saliency image generation apparatus 100 generates a second saliency image by multiplying (1) an image generated by applying a saliency extraction scheme to the area that was determined in operation S140, and (2) the converted first saliency image (i.e., the first saliency image after being converted into a second size in operation S120).

When a saliency extraction scheme is applied only in an area which has been determined in an input image which has been converted into a second size according to an embodiment, the saliency may be more minutely extracted than when the saliency extraction scheme is applied to the entire area of the input image that has been converted into the second size.

Furthermore, a second saliency image may be generated by multiplying an image, which has applied the saliency extraction scheme to a certain area of the input image which has been converted into the second size, and a first saliency image which has been converted into the second size.

For example, the size of the second saliency image may be 128×128, which is the same as the second size.

FIGS. 3A through 3D are diagrams illustrating an example of a first saliency corresponding to an input image, which has been converted into various sizes, in the saliency image generation, according to an embodiment.

Figure 3D:
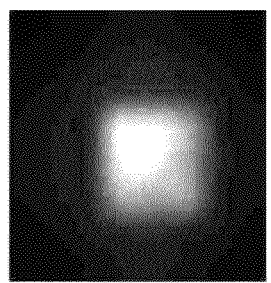
FIG. 3A, FIG. 3B, FIG. 3C, and FIG. 3D are diagrams illustrating an example of a first saliency corresponding to an input image that has been converted into various sizes in the saliency image generation process, according to an embodiment.
Figure 3C:
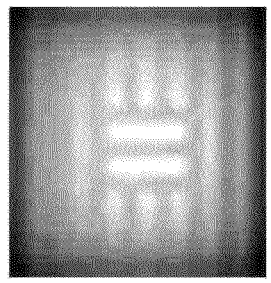
Figure 3B:
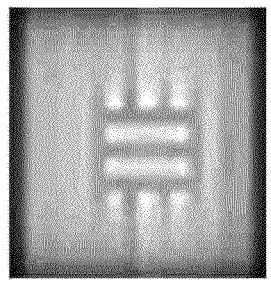
Figure 3A:
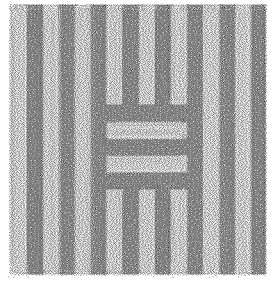

The input image shown in FIG. 3A has been converted into a 256×256 size, and the saliency extraction scheme has been applied to the converted image so as to generate the first saliency image shown in FIG. 3B.

Furthermore, FIG. 3C shows a first saliency image generated by converting the input image of FIG. 3A into a 128×128 size and then applying the saliency extracting scheme to the converted image, and FIG. 3D shows a first saliency generated by applying the saliency extraction scheme by converting the input image as in FIG. 3A into a 64×64 size.

As illustrated in FIG. 3A, the first saliency images corresponding to respective images which have been generated by converting the same input image into a plurality of sizes are different.

For example, as shown in FIG. 3D, when the input image is converted into a 64×64 size, it may be determined that the first saliency image, in which the saliency extraction has been most appropriately performed, has been generated.

However, the size of the input image, from which an appropriate saliency may be detected, may depend on the input image, and thus in the case of the saliency detection algorithm, the scheme of integrating the result obtained from a plurality of sizes into one through a weighted sum may be used.

Figure 4:
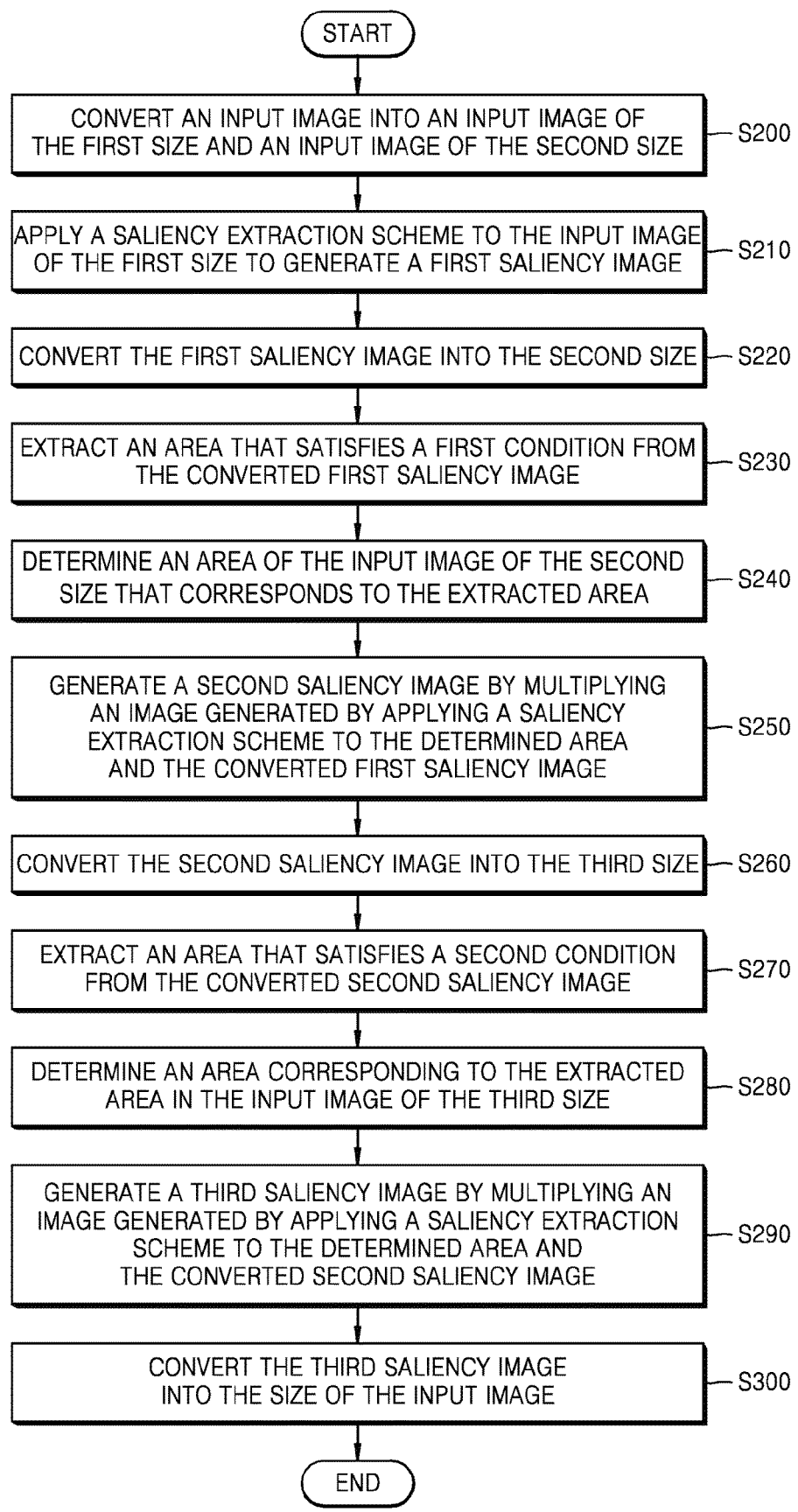
FIG. 4 is a flowchart of a method of generating a hierarchical saliency image using selective refinement, according to another embodiment.

The operations of the saliency image generation apparatus 100 according to another embodiment are described in order with reference to FIG. 4, which is a flowchart of a method of generating a hierarchical saliency image using selective refinement.

In operation S200, the saliency image generation apparatus 100 converts the input image into a first size, a second size, and a third size.

For example, the first size, the second size, or the third size may be smaller than the size of the input image, and it may be that the first size<the second size<the third size. Furthermore, the first size, the second size, or the third size, may be of a regular quadrilateral. For example, the first size may be 64×64, the second size may be 128×128, and the third size may be 256×256.

Operations S210 to S250 correspond to operations S110 to S150 of FIG. 2, and thus the detailed description thereof will be omitted here.

In operation S260, the saliency image generation apparatus 100 converts the second saliency image generated in operation S250 into a third size.

According to an embodiment, the saliencies are extracted from respective images that have been converted into a plurality of sizes, and the second saliency image may be converted into the third size so that the extracted saliencies to be selectively refined. In this case, a certain area may be selected from the converted input image (converted in operation S200) by using converted second saliency image.

For example, the size of the second saliency image may be 256×256, which is the same as the third size.

In operation S270, the saliency image generation apparatus 100 extracts an area that satisfies the second condition from the converted second saliency image (i.e., the image that was converted into the third size in operation S260).

In operation S280, the saliency image generation apparatus determines the area corresponding to the extracted area in the input image of the third size.

The second saliency image according to an embodiment may be displayed in a single color or as a luminance image. As such, each pixel in the second saliency image may include color information which may display 256 gray levels from 0 (black) to 255 (white).

The second condition according to an embodiment may be set based on the value of the gray level of the pixel of the converted second saliency image (i.e., the second saliency image that was converted into the third size).

For example, the number of pixels, which satisfy the second condition in the converted second saliency image, may be set to be 50% of the total number of pixels of the converted second saliency image. In this case, the number of pixels, which have been selected from the converted input image of the third size, may become 50% of the total number of pixels of the converted input image of the third size.

In operation S290, the saliency image generation apparatus 100 generates a third saliency image by multiplying: (1) an image, to which the saliency extraction scheme has been applied to the area determined in operation S270, and (2) the converted second saliency image (i.e., the second saliency image that was converted into the third size in operation S260).

When applying the saliency extraction scheme only to the determined area of the input image of the third size, according to an embodiment, the saliency may be extracted more minutely than when applying the saliency extraction scheme to the entire area of the input image of the third size.

Furthermore, a more minute third saliency image may be generated by this multiplying step.

For example, the size of the third saliency image may be 256×256, which is the same as the third size.

In operation S300, the saliency image generation apparatus 100 converts the third saliency image, which was generated in operation S290, into the size of the input image.

For example, the size of the third saliency image generated in operation S280 may be of a regular quadrilateral and may be 256×256, which is smaller than the size of the input image, and thus the third saliency image may be enlarged to the size of the input image.

Figure 5:
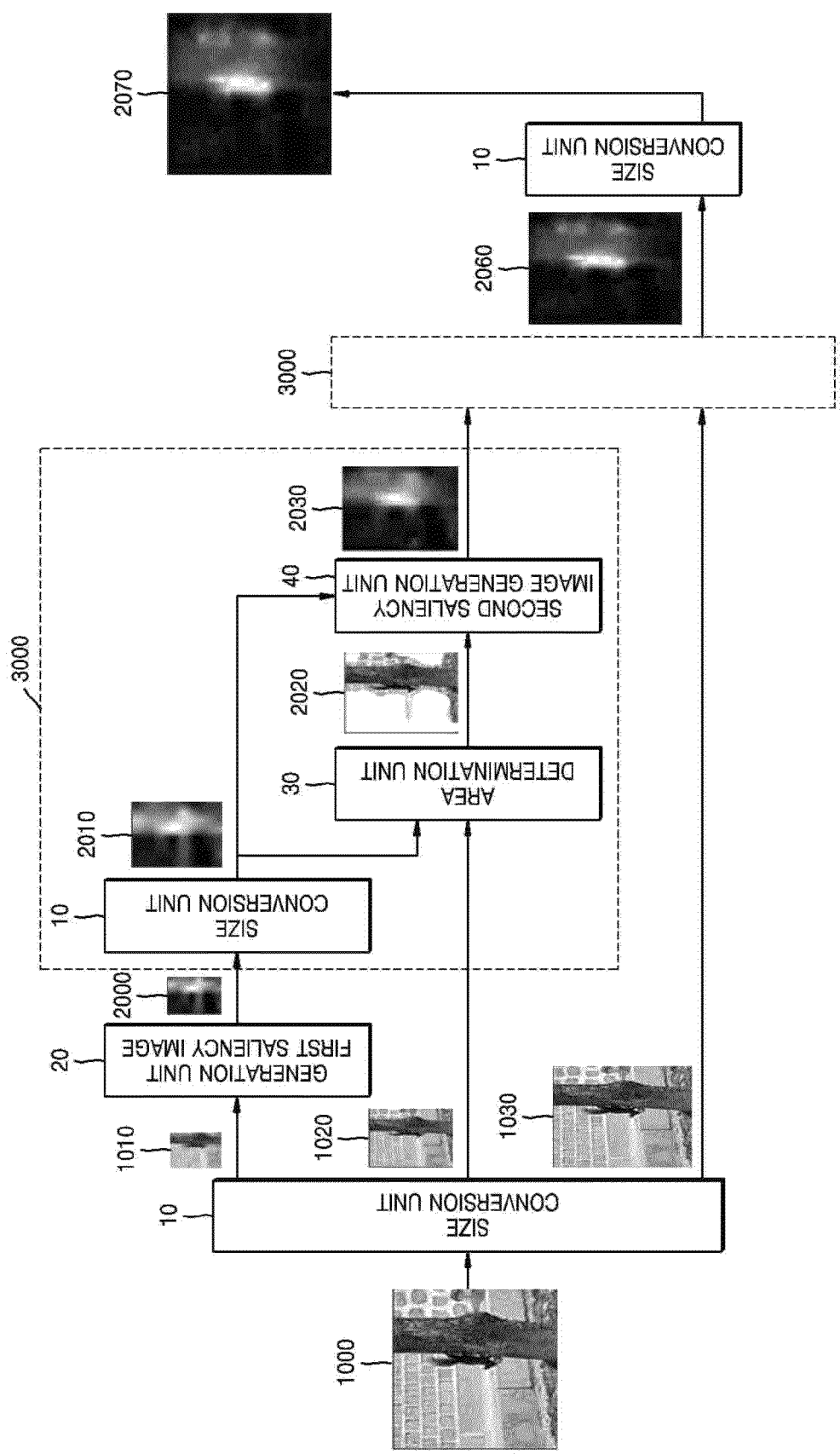
FIG. 5 and FIG. 6 are conceptual diagrams illustrating a method of generating a second saliency image and a third saliency image by using multiple images that have been generated by converting an input image into images of a multiple sizes and carrying out selective refinement in the saliency image generation apparatus, according to an embodiment.
Figure 6:
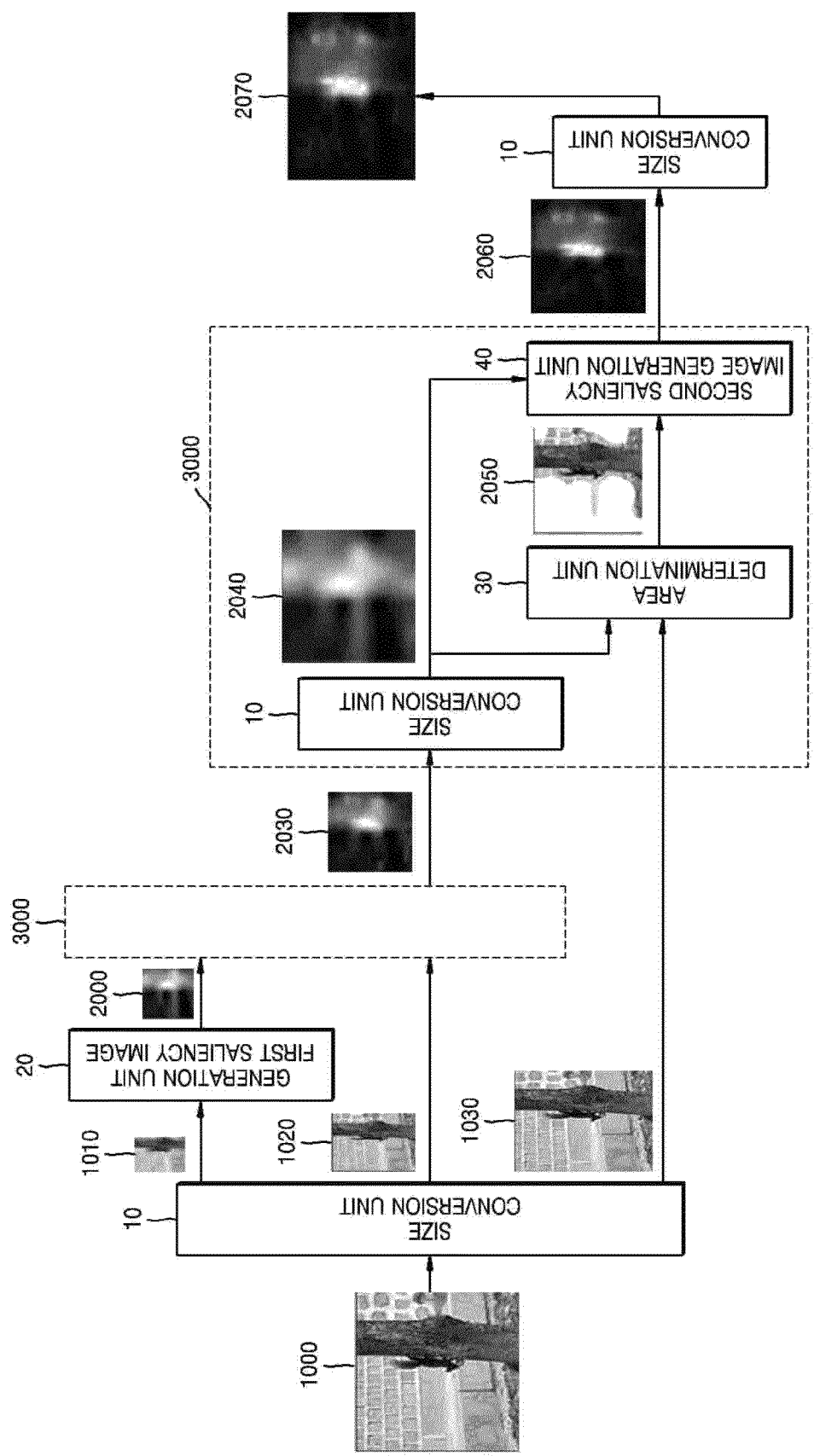

FIGS. 5 to 6 are conceptual diagrams illustrating a method of generating a second saliency image and a third saliency image by using multiple images (generated by converting an input image into images of a different sizes) and selective refinement, in the saliency image generation apparatus 100, according to an embodiment.

As illustrated in FIG. 5, an input image 1000 may be converted into an input image 1010 of a first size, an input image 1020 of a second size, and an input image 1030 of a third size by the size conversion unit 10.

For example, the input image is composed of multiple pixels, and each pixel may include color information indicating the brightness of each of red R, green G, and blue B as 256 kinds of grayscale. For example, the first size may be 64×64, the second size may be 128×128, and the third size may be 256×256, but may be smaller than the size of the input image 1000.

Furthermore, the first saliency image generation unit 20 may generate a first saliency image 2000 from the input image 1010 of the first size.

For example, the first saliency image 2000 may display the saliency, which was extracted from the input image, in a single color or as a lamination image. As such, each pixel of the first saliency image 2000 according to an embodiment may include color information that may display 256 gray levels from 0 (black) to 255 (white). Furthermore, the size of the first saliency image 2000 may be 64×64, which is the same as the first size.

Furthermore, the area determination unit 30 may extract the area that satisfies the first condition from a converted first saliency image 2010 (i.e., converted into the second size by the size conversion unit 10), and determine the area corresponding to the extracted area in the input image 1020 of the second size.

The first condition according to an embodiment may be set based on the level of the gray level of the pixel of the converted first saliency image 2010. For example, the number of pixels, which satisfy the first condition in the converted first saliency image 2010, may be set to become 70% of the total number of pixels of the converted first saliency image 2010.

Furthermore, the second saliency image generation unit 40 may generate a second saliency image 2030 by multiplying (1) an image 2020, which includes a certain area that was determined from the input image 1020 (of the second size), and (2) the converted first saliency image 2010.

For example, the image 2020, the converted first saliency image 2010, and the second saliency image 2030 may each be 128×128.

As illustrated in FIG. 6, the area determination unit 30 may extract the area, which satisfies the second condition, from a converted third saliency image 2060 (which is of the third size), and determine the area corresponding to the extracted area from the input image 1030 (which has been converted into the third size).

The second condition according to an embodiment may be set based on the value of the gray level of the pixel of the converted second saliency image 2040 (which has been converted into the third size). For example, the number of pixels, which satisfy the second condition in the converted second saliency image 2040, may be set to become 50% of the total number of pixels of the converted second saliency image 2040.

Furthermore, the second saliency image generation unit 40 may generate the third saliency image 2060 by multiplying (1) an image 2050, which includes a certain area that has been determined from the input image 1030, and (2) the converted second saliency image 2040.

For example, the image 2050, the converted second saliency image 2040, and the third saliency image 2060 may each be 256×256.

Furthermore, the third saliency image 2060 may be converted into a third saliency image 2070 of the size of the input image 1000 by the size conversion unit 10.

FIGS. 7A-7F illustrate a saliency image according to a related art and a second saliency image or a third saliency image that have been generated by the saliency image generation apparatus 100 according to an embodiment.

Figure 7C:
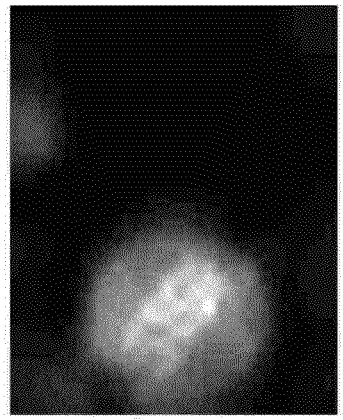
FIG. 7A, FIG. 7B, FIG. 7C, FIG. 7D, FIG. 7E, and FIG. 7F illustrate a saliency image according to related art, along with a second saliency image or a third saliency image generated by the saliency image generation apparatus, according to an embodiment.
Figure 7F:
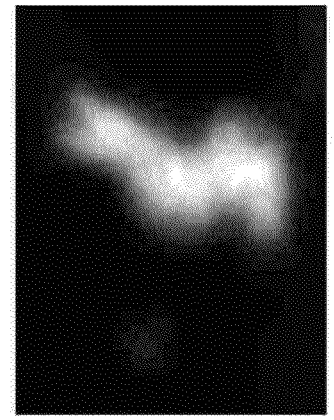
Figure 7B:
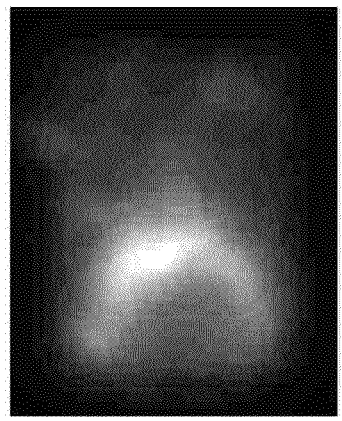
Figure 7E:
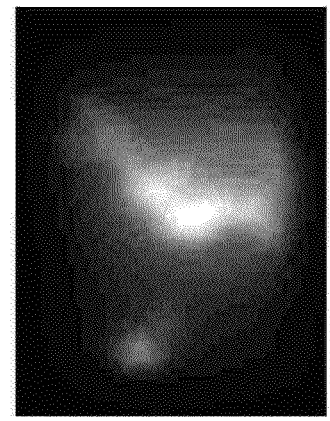
Figure 7A:
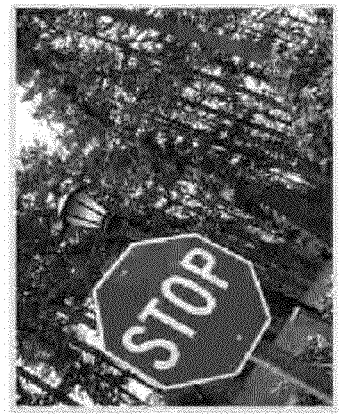
Figure 7D:
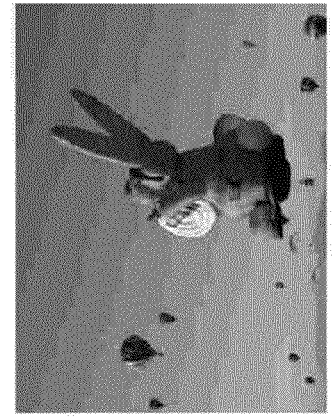

FIG. 7B or FIG. 7E illustrate a saliency image that has been generated by applying a saliency detection scheme to an input image of one size in the existing scheme in an input image as shown in FIG. 7A or FIG. 7D.

Furthermore, FIG. 7C or FIG. 7F illustrate each image generated by converting the same input image into a multiple sizes, and a second saliency image or a third saliency image by applying a saliency detection scheme using selective refinement.

For example, the overall shape of the object of the input image or the detailed information of the image as shown in FIG. 7A or FIG. 7D may be more effectively expressed in the saliency image illustrated in FIG. 7C or FIG. 7F than the saliency image illustrated in FIG. 7B or FIG. 7E.

A saliency image generation apparatus according to various embodiments of the disclosure may include a memory for storing and executing program data, a permanent memory (storage) such as a disk drive, and a user interface such as a touch panel, keys, and buttons.

In addition, other embodiments of the disclosure can also be implemented through computer-readable code/instructions in/on a medium, e.g., a non-transitory computer-readable medium, to control at least one processing element to implement any above-described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be such a defined and measurable structure including or carrying a signal or information, such as a device carrying a bitstream according to one or more embodiments of the disclosure. The media may also be a distributed network, so that the computer-readable code is stored/transferred and executed in a distributed fashion. Furthermore, the processing element could include a processor or a computer processor, and processing elements may be distributed and/or included in a single device.

Any references, including publications, patent applications, and patents, cited herein are hereby incorporated by reference to the same extent as if each reference were individually and specifically indicated to be incorporated by reference and were set forth in its entirety herein.

To aid in understanding of the disclosure, reference symbols have been used in the embodiments illustrated in the drawings, and particular terminology has been used to describe these embodiments. However, this particular terminology has no intention to limit the scope of the disclosure, and the disclosure should be construed to include all components that would normally occur to those of ordinary skill in the art.

Embodiments of the disclosure may be described in terms of functional blocks and various processing steps. Such functional blocks may be realized by any number of hardware and/or software components configured to perform particular functions. For example, the embodiments of the disclosure may employ various integrated circuit components, such as memory elements, processing elements, logic elements, loop-up tables, etc., that may carry out various functions under the control of one or more microprocessors or other control devices. Similarly, where the components of the embodiments may be implemented using software programming or software elements, the embodiments may be implemented with any programming or scripting language, such as C, 0++, Java, assembler, etc., to include various algorithms implemented using any combination of data structures, processes, routines, or other programming elements. Functional aspects may be implemented as algorithms executed by one or more processors. Furthermore, the embodiments of the disclosure may employ related art for electronics configuration, signal processing, data processing, and/or so on. The terms, such as "mechanism," "element," and "configuration," may be used broadly and are not limited to mechanical and physical configurations. The terms may include a series of routines of software in conjunction with a processor and so on.

Particular implementations described in the disclosure are embodiments and are not intended to limit the scope of the disclosure in any way. For the sake of brevity, existing electronics, control systems, software development and other functional aspects of the systems may be omitted. Furthermore, the connecting lines, or connectors between components shown in the figures are intended to present exemplary functional connections and/or physical or circuit connections. In a practical apparatus, a variety of alternative or additional functional connections, physical connections, or circuit connections may be present. Moreover, a component may not be essential to the practice of the disclosure unless the element is specifically described as "essential" or "critical."

The use of the terms "a," "an," "the," and similar referents in this disclosure (especially in the claims) may be construed to cover both the singular and the plural. Furthermore, recitation of ranges of values herein are merely intended to serve as a shorthand method of referring individually to each separate value falling within the range (unless otherwise indicated herein), and each separate value is incorporated into the specification as if it were individually recited herein. Finally, the steps of a method described herein may be performed in any suitable order unless otherwise indicated herein or otherwise clearly contradicted by context. The disclosure is not limited to the described order of the steps. The use of any and all examples, or exemplary terms (e.g., such as) provided herein is intended merely to describe and does not pose a limitation on the scope of the disclosure unless otherwise claimed. Numerous modifications, combinations, and changes according to design conditions and factors will be apparent to those of ordinary skill in the art within the scope of the following claims or equivalents thereof.

What is claimed is:

1. A method of generating a saliency image, the method comprising:
    converting an input image into an input image of the first size and an input image of the second size;
    applying a saliency extraction scheme to the input image of the first size to generate a first saliency image; converting the first saliency image to the second size;
    extracting an area that satisfies a first condition from the converted first saliency image;
    determining an area of the input image of the second size that corresponds to the extracted area; and
    generating a second saliency image by multiplying
        an image generated by applying the saliency extraction scheme to the determined area, and
        the converted first saliency image.

2. The method of claim 1, wherein the first size and the second size are smaller than the size of the input image and the first size is smaller than the second size.

3. The method of claim 1, wherein the first condition is set based on a gray level value of a pixel of the resized first saliency image.

4. The method of claim 1, further comprising:
    converting the input image into an input image of a third size;
    converting the second saliency image to the third size;
    extracting an area that satisfies a second condition from the converted second saliency image;
    determining an area corresponding to the extracted area of the input image of the third size; and
    generating a third saliency image by multiplying
        an image generated by applying the saliency extraction scheme to the determined area, and
        the converted second saliency image.

5. The method of claim 4, further comprising converting the third saliency image into a size of the input image.

6. The method of claim 4, wherein the third size is smaller than the input image, the first size is smaller than the second size, and the second size is smaller than the third size.

7. The method of claim 4, wherein the second condition is set based on a gray level value of the converted second saliency image.

8. The method of claim 7, wherein a gray level value in the second condition is greater than the gray level value in the first condition.

9. An apparatus for generating a saliency image, the apparatus comprising:
    a size conversion unit that converts an input image into a input image of a first size and an input image of the second size and converts a first saliency image into the second size;
    a first saliency image generation unit that generates the first saliency image by applying a saliency extraction scheme to the input image of the first size;
    an area determination unit that extracts an area that satisfies a first condition from the converted first saliency image and determines an area corresponding to the extracted area from the input image of the second size; and
    a second saliency generation unit that generates a second saliency image by multiplying
        an image generated by applying the saliency extraction scheme to the determined area, and
        the converted first saliency image.

10. The apparatus of claim 9, wherein the first size and the second size are smaller than the input image and the first size is smaller than the second size.

11. The apparatus of claim 9, wherein the first condition is set based on a gray level value of a pixel of the first saliency image which has been converted into the second size.

12. The apparatus of claim 9, wherein
    the size conversion unit converts the input image into an input image of a third size and converts the second saliency image into the third size,
    the area determination unit extracts an area that satisfies a second condition from the converted second saliency image and determines an area corresponding to the extracted area from the input image of the third size, and
    the second saliency image generation unit generates a third saliency image by multiplying
        an image generated by applying the saliency extraction scheme to the determined area, and
        the converted second saliency image.

13. The apparatus of claim 12, wherein the size conversion unit converts the third saliency image into a size of the input image.

14. The apparatus of claim 12, wherein the third size is smaller than the input image, the first size is smaller than the second size, and the second size is smaller than the third size.

15. The apparatus of claim 12, wherein the second condition is set based on a gray level value of the converted second saliency image.

16. The apparatus of claim 12, wherein the gray level value in the second condition is greater than the gray level value in the first condition.

17. A non-transitory computer-readable storage medium having stored thereon computer executable instructions for performing a method comprising:
   converting an input image into an input image of the first size and an input image of the second size;
   applying a saliency extraction scheme to the input image of the first size to generate a first saliency image;
   converting the first saliency image to the second size;
   extracting an area that satisfies a first condition from the converted first saliency image;
   determining an area of the input image of the second size that corresponds to the extracted area;
   generating a second saliency image by multiplying
      an image generated by applying the saliency extraction scheme to the determined area, and
      the converted first saliency image.

18. The non-transitory computer-readable storage medium of claim 17, wherein the first size and the second size are smaller than the input image and the first size is smaller than the second size.

19. The non-transitory computer-readable storage medium of claim 17, wherein the method further comprises:
   converting the input image into an input image of a third size;
   converting the second saliency image to the third size;
   extracting an area that satisfies a second condition from the converted second saliency image;
   determining an area corresponding to the extracted area of the input image of the third size; and
   generating a third saliency image by multiplying
      an image generated by applying the saliency extraction scheme to the determined area, and
      the converted second saliency image.

20. The non-transitory computer-readable storage medium of claim 17, wherein the method further comprises converting the third saliency image into a size of the input image.

21. The non-transitory computer-readable storage medium of claim 17, wherein the third size is smaller than the input image, the first size is smaller than the second size, and the second size is smaller than the third size.

* * * * *